(12) United States Patent
Achtner

(10) Patent No.: US 6,856,468 B2
(45) Date of Patent: Feb. 15, 2005

(54) ZOOM LENS

(75) Inventor: Bertram Achtner, Schwaebisch Gmuend (DE)

(73) Assignee: Zeiss Optronik GmbH, Oberkochen (DE)

( * ) Notice: Subject to any disclaimer, the term of this patent is extended or adjusted under 35 U.S.C. 154(b) by 0 days.

(21) Appl. No.: 10/690,347

(22) Filed: Oct. 21, 2003

(65) Prior Publication Data

US 2004/0201903 A1 Oct. 14, 2004

(30) Foreign Application Priority Data

Oct. 23, 2002 (DE) .................................. 102 49 282

(51) Int. Cl.⁷ .......................... G02B 15/14; G02B 17/00
(52) U.S. Cl. ................................. 359/687; 359/734
(58) Field of Search ............................... 359/676, 683, 359/687, 726, 733, 734

(56) References Cited

U.S. PATENT DOCUMENTS

| | | | |
|---|---|---|---|
| 3,743,384 A | 7/1973 | Nakamura | 359/687 |
| 4,749,268 A | 6/1988 | Moskovich et al. | 359/698 |
| 5,050,972 A | 9/1991 | Mukaiya et al. | 359/683 |
| 5,815,323 A | 9/1998 | Abe et al. | 359/688 |
| 5,963,376 A | 10/1999 | Togino | 359/676 |
| 6,333,823 B1 * | 12/2001 | Ozaki et al. | 359/690 |
| 2001/0046383 A1 | 11/2001 | Hagimori et al. | 359/687 |

FOREIGN PATENT DOCUMENTS

| | | |
|---|---|---|
| JP | 58202420 | 11/1983 |
| JP | 59028121 | 2/1984 |
| JP | 60057813 | 4/1985 |

* cited by examiner

Primary Examiner—Georgia Epps
Assistant Examiner—William Choi
(74) Attorney, Agent, or Firm—Welsh & Katz, Ltd.

(57) ABSTRACT

A zoom lens comprises in a direction of light propagation a front lens group (G1) having positive refractive power, a variator lens group (G2) having negative refractive power, a compensator lens group (G3) having positive refractive power, and a base lens group (G4) having positive refractive power. The base lens group (G4) comprises a first base lens group (G4.1) and a second base lens group (G4.2). The front lens group (G1), the variator lens group (G2), the compensator lens group (G3) and the first base lens group (G4.1) are arranged along a common straight first optical axis (23). The second base lens group (G4.2) is arranged along a second optical axis 23') inclined with respect to the first optical axis (23) at a first angle α different from 0° and 180°. A beam deflector (18) is arranged between the first base lens group (G4.1) and the second base lens group (G4.2).

22 Claims, 3 Drawing Sheets

ZOOM LENS

BACKGROUND OF THE INVENTION

1. Field of the Invention

The invention relates to a zoom lens comprising in a direction of light propagation a front lens group having positive refractive power, a variator lens group having negative refractive power, a compensator lens group having positive refractive power, a base lens group having positive refractive power.

Numerous zoom lenses are already known from the prior art. The zoom lenses must fulfil specific optical and/or mechanical properties, depending on requirement.

2. Description of the Related Art

Zoom objectives for photography typically have a zoom factor of 2 to 4. The exit pupil vision is not telecentrically configured here. The installed length is to be kept as short as possible with these zoom lenses.

Furthermore, zoom lenses for video recordings, for example camcorders, are known from the general prior art. The CCD detectors used in this case have an image diameter of at most 11 mm. The zoom factor is specified here mostly as 10, the focal range reaching from 3 mm to 50 mm in known makes.

The zoom factor for such lenses is approximately 20 to 30 in the case of zoom lenses for television recordings. The CCD detectors used in this case have an image diameter of typically 11 mm. Focusing is performed here by the front group, as a rule. These lenses must have a long back focus in order to be able to install a color-splitting prism between a last lens and a detector.

Afocal zoom lenses are frequently used as component parts in instrumental optics. The diaphragm position can be varied during the zooming operation in the case of such systems.

None of the zoom lenses enumerated corresponds per se to the desired characteristics of a zoom lens for military reconnaissance. It is also impossible to create other characteristics for the said zoom lenses by a few and simple conversions by means of known optical computing programs. Moreover, the multiplicity of afocal zoom lenses have a smaller diameter to achieve a constant aperture number over a focal range of up to approximately 280 mm in combination with a lens of suitable focal length.

SUMMARY OF THE INVENTION

Consequently, it is an object of the invention to create a zoom lens that fulfils the requirements with reference to optical properties and focusing characteristics, the aim being for the installation space, of which only a limited amount is available, to be kept as small as possible, and for the zoom lens to be capable of functioning in a temperature range from −35° C. to +75° C.

According to the invention, this object is achieved by virtue of the fact that the base lens group comprising a first base lens group and a second base lens group, wherein the front lens group, the variator lens group, the compensator lens group and the first base lens group are arranged along a common straight first optical axis, wherein the second base lens group is arranged along a second optical axis inclined with respect to the first optical axis at a first angle α different from 0° and 180°, and wherein a beam deflector is arranged between the first base lens group and the second base lens group.

The zoom lens comprises a front lens group, a variator lens group, a compensator lens group and a base lens group, the base lens group being split into two groups with a positive refractive power in each case. Splitting the base lens into two produces a relatively large air space between the first base lens group and the second base lens group. The second base lens group of the base lens group is arranged at a specific angle α to the first base lens group of the base lens group, it being advantageously possible thereby for an at least approximately L-shaped arrangement of the zoom lens to be produced. A plane mirror for beam deflection is advantageously located in the air space between the first base lens group and the second base lens group.

Such an arrangement can be used to implement the special characteristics for a zoom lens for military reconnaissance, the result being a zoom lens of high imaging quality, compact installation space because of the angle α, large zoom factor and large spectral range.

It can be provided advantageously that the first base lens group and the second base lens group are arranged at a distance along the first and second optical axis, which distance is at least 15% of the overall length of the zoom lens, measured from a vertex of the front lens group to the back focal plane of the base lens group.

The refractive powers, of the two groups of the base lens group are to be selected such that as large an air space as possible is permitted between the two groups. The air space should be at least 15% of the installed length of the zoom lens. It is thereby possible that a beam deflector can be introduced into this air space, and thus that an installation space as small and compact as possible is created.

With a design principle according to the invention it is possible to design zoom lenses for military reconnaissance which should to have specific optical properties such as, for example, a zoom factor of 8, a variable focal range of 34 mm to 272 mm, an aperture number of at least 3.2 and, in a wavelength region from 450 nm to 750 nm, an outstanding optical imaging quality. Moreover, special mechanical properties, such as integration in a compact installation space, must be created for such zoom lenses. An important role is played, furthermore, by the environmental conditions. Zoom lenses for military reconnaissance must ensure they can function in a wide temperature range from intense cold to excessive heat.

Advantageous embodiments and developments emerge from the further subclaims and the exemplary embodiment described below in principle with the aid of the drawing, in which:

BRIEF DESCRIPTION OF THE DRAWINGS

FIG. 2b corresponds to f=122 mm and

FIG. 2c corresponds to f=272 mm.

DETAILED DESCRIPTION

Figure 1:
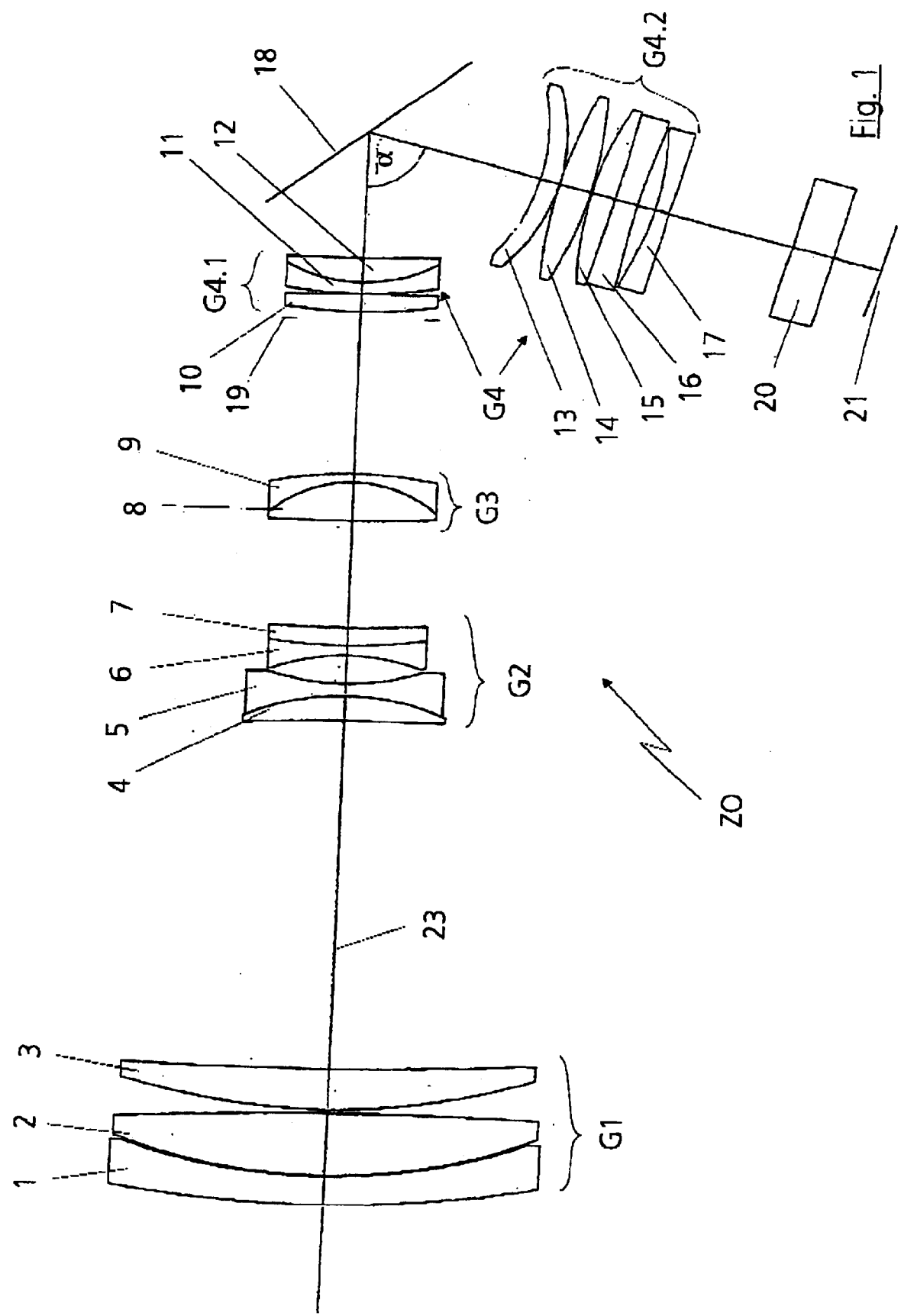
FIG. 1 shows an illustration of the principle of a zoom lens for military reconnaissance (lens section)

FIG. 1 shows an illustration of the principle of an inventive zoom lens ZO in lens section for military reconnaissance. The zoom lens ZO comprises a front lens group G1 of positive refractive power, a variator lens group G2 of negative refractive power, a compensator lens group G3 of positive refractive power, a base lens group G4 of positive refractive power and an optical spectral filter 20. The front lens group G1 is constructed from a negative lens 1 and two positive lenses 2 and 3. The negative lens 1 and the positive lens 2 are a split cemented component. This is advantageous because of the large difference in the coefficient of thermal linear expansion a of the two lenses 1 and 2. The positive lenses 2 and 3 are made from FluorCrown (FK) or a comparable material with respect to abnormal partial dispersion.

The variator lens group G2 comprises two cemented components, each cemented component having a negative refractive power. The positive lenses 4 and 7 of the two cemented components are made from high-index dense flint (SF) glasses of long-crown type. A type of glass is long crown when it holds that $\Delta P_{g,F}>0$ for the deviation of the relative partial dispersion $\Delta P_{g,F}$ from the normal straight line. The negative lenses 5 and 6 are of short flint type such as, for example, the dense lanthanum flint (LaSF). Thus, a glass is of short flint type when it holds that $\Delta P_{g,F}<0$ for $\Delta P_{g,F}$.

The compensator lens group G3 is preferably designed as a cemented component of a positive lens 8 and a negative lens 9.

The base lens group G4 is divided into two groups, wherein a first base lens group G4.1 is arranged along a first optical axis 23 and a second base lens group G4.2 is arranged along a second optical axis 23'. The second optical axis 23' is inclined with respect to the first optical axis 23 at a first angle α different from 0° and 180°. In the zoom lens according to the example α=75°. A relatively large air space for introducing a beam deflector 18 for beam deflection is provided between the first base lens group G4.1 and the second base lens group G4.2. The beam deflector 18 is a plane mirror with a mirror surface having a normal to the mirror surface 18' wherein the normal to the mirror surface 18' being inclined to the first optical axis 23 at a second angle which is a half of the first angle α.

The distance between the first base lens group G4.1 and the second base lens group G4.2 should amount to at least 15% of the overall length of the zoom lens ZO measured from a vertex of the front lens group G1 to a back focal plane of the base lens group G4. The beam is deflected by 105° in this exemplary embodiment. The result is a L-shaped structure of the zoom lens ZO. The two limbs of the L-shaped installation space thereby form an acute angle α of 75°. The beam deflection can, of course, also be performed by a deflecting prism instead of the plane mirror 18.

Figure 2A:
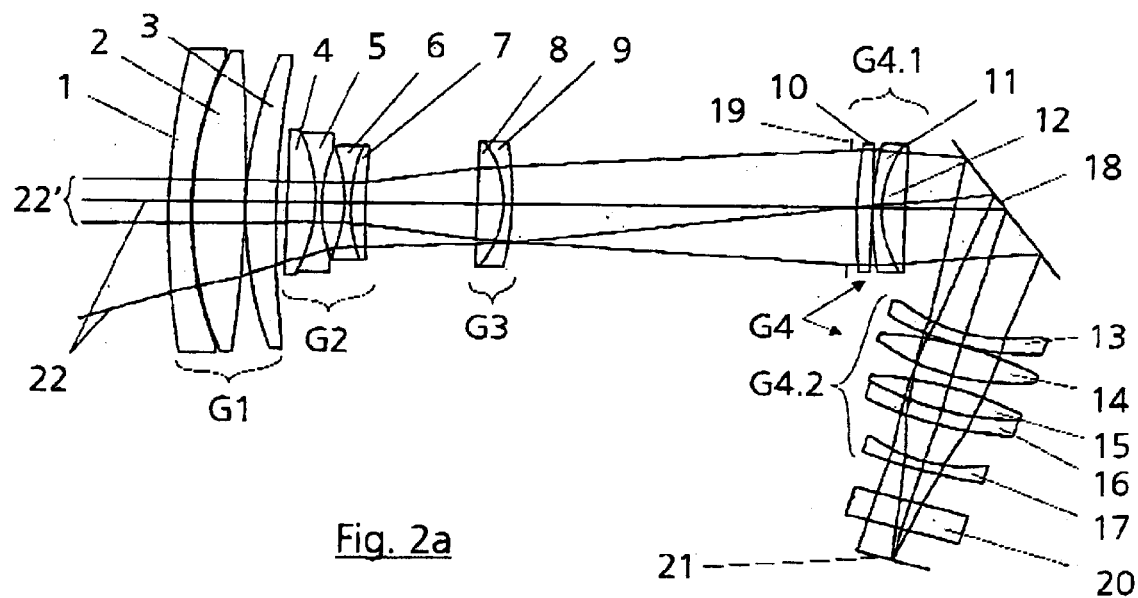
FIGS. 2a to 2c show a lens section of a zoom lens of three focal length settings, where FIG. 2a corresponds to f=34 mm.
Figure 2B:
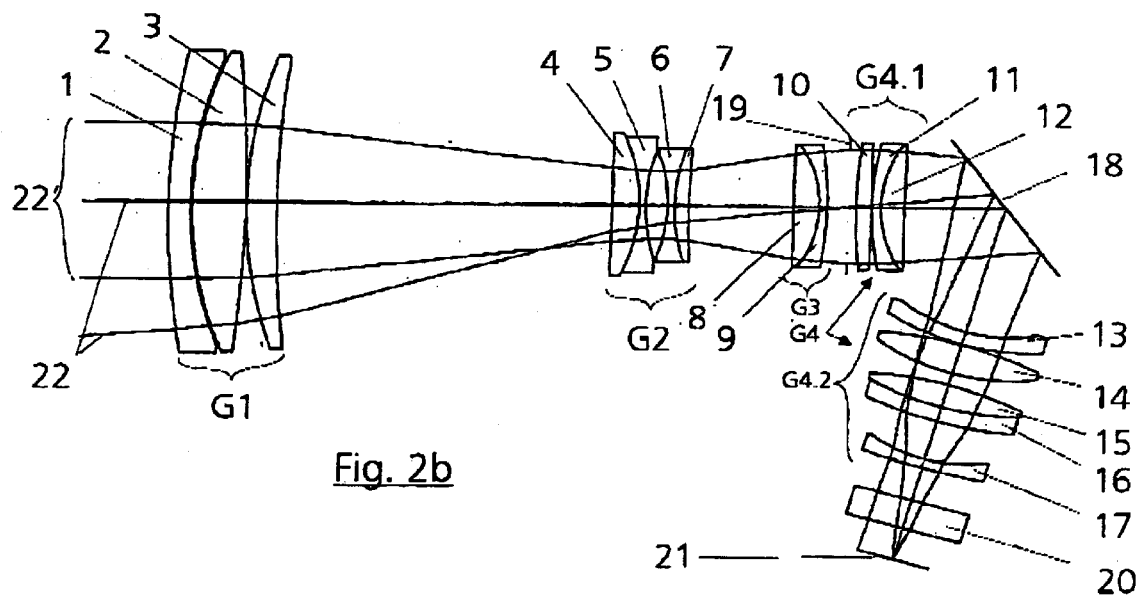
Figure 2C:
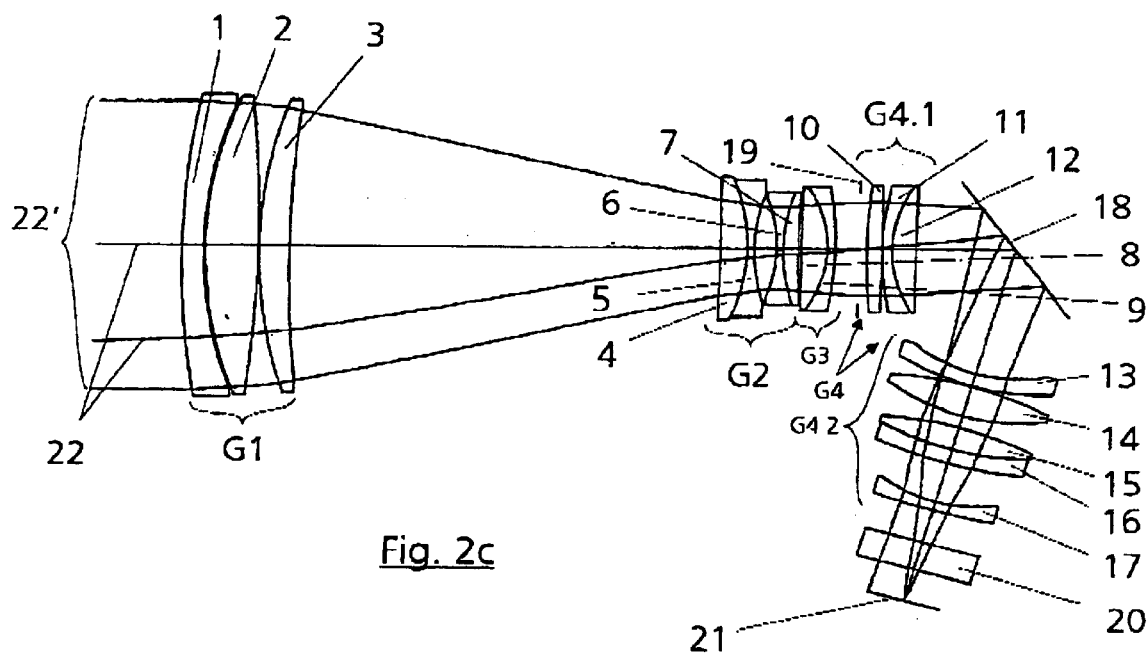

An iris diaphragm 19 is arranged in the direction of light propagation between the compensator lens group G3 and the first base lens group G4.1. The iris diaphragm 19 is imaged by the base lens group G4 such that its image appears virtually at infinity (∞). Because of pupil aberrations, it is not possible to produce on the image side a telecentric beam profile for all centroid rays 22 which are illustrated in FIGS. 2a to 2c. The ray that runs centrally between an upper and a lower coma ray is designated as centroid ray 22. The iris diaphragm 19 should be positioned such that a deviation from telecentricity is as small as possible. The deviation from telecentricity should be at most 1.7°.

The position and size of the iris diaphragm 19 are not changed during the variation in focal length. This means the distance of the diaphragm to the first base lens group G4.1 is fixed during zooming.

Lens sections are illustrated in FIGS. 2a to 2c for three focal length settings.

In FIG. 2a, the focal width is f=34 mm. The first base lens group G4.1 of the base lens group G4 has a positive refractive power and comprises a single lens 10 of positive refractive power and a cemented component that is assembled from the lens 11 and 12 and is of positive refractive power. The single lens 10 is produced from FluorCrown (N-FK51). The positive lens 12 in the cemented component is made from dense phosphate crown (N-PSK53), and the negative lens is made from lanthanum flint (N-LAF2). The relationships between the types of glass are in accordance with the Schott glass catalogue. The lenses 10, 11 and 12 can, of course, also be produced from other types of glass with comparable characteristics. It is important to heed in this case the abnormal partial dispersion. If glasses from other manufacturers, for example OHARA, are used, it must be borne in mind that the refractive index $n_d$, dispersion $v_d$ and the abnormal partial dispersion $\Delta P_{g,F}$ deviate by at most 10%.

The second base lens group G4.2 of the base lens group G4 is of positive refractive power overall and preferably serves as a focusing group. The second base lens group G4.2 can be moved along the second optical axis 23' for focussing in order thus to hold the image position, which is displaced in the event of a change in temperature and air pressure. Since the refractive indexes, the thicknesses and the radii of the individual lenses are a function of temperature, the image position is displaced in the event of a change in temperature and air pressure. At high temperatures, for example approximately +60° C., the image position is no longer situated in a detector plane 21, but behind the latter. At low temperatures of approximately −20° C., the image plane is likewise not located in the detector plane 21, but between the optical spectral filter 20 and the detector plane 21. Likewise, objects situated close by can be sharply focused using the focusing group G4.2. Consequently, an internal focusing is implemented with the aid of which it is possible to balance out the changes in temperature and air pressure, and it is likewise possible to focus on objects situated close by. The variation in focal length and the internal focusing are independent of one another.

The focusing group G4.2 comprises a meniscus-shaped lens 13, a positive lens 14 that is produced from FluorCrown (FK), a cemented element composed of the two lenses 15 and 16, and a negative lens 17. The glass of the meniscus-shaped lens 13 is of long-crown type. The glass of the negative lens 17 is of short flint type.

The optical spectral filter 20 is an absorption filter consisting of a colored glass with a vapour-deposited edge filter. The optical spectral filter 20 is arranged between the second base lens group G4.2 and the back focal plane of the base lens group G4. The colored glass is preferably a yellow glass. This longpass filter glass is distinguished in that it has low transmission in the short wave spectral region and high transmission in the long wave spectral region of course, it is possible here to select with reference to the colored glass used which spectral region is to be passed and which is to be blocked. The yellow glass correspondingly attenuates the blue and violet light. Consequently, the colored glass restricts the spectral region beyond ultraviolet (UV). Other colored glasses can also be used in principle. Slight differences in the refractive index of the colored glasses can be compensated with the aid of the second base lens group G4.2 without loss of imaging quality. The vapour-deposited edge filter limits the spectral region beyond infrared (IR). The zoom lens according to the invention is designed here for the spectral region from 450 nm to 750 nm. A smaller spectral region can be selected within this region by selection of colored glass and edge displacement. It is also possible to displace the spectral region to 500 nm to 850 nm. The change in the image position can be compensated by using the second base lens group G4.2.

For specific applications, for example for a periscope in submarines, it is necessary to produce an image offset on the detector 21. The image offset is achieved by tilting or rotating the optical spectral filter 20 around the second optical axis 23'. There should be a large filter thickness in order to keep the tilting angle as small as possible.

The air space between the last lens 17 of the base lens group G4 and the detector 21 should be optimized with regard to focusing movement of the second base lens group G4.2, the thickness and the rotary or tilting movement of the optical spectral filter 20 and of the installation space of the detector 21, depending on the special characteristic and focal length of the zoom lens ZO.

The refractive power and the position of the front main plane of the split base lens group G4 image the iris diaphragm 19, located at a short distance in front of the base lens group G4, to infinity or virtually to infinity. The position of the iris diaphragm 19 should not be changed during the zooming operation, since the iris diaphragm 19 limits the rays impinging on the base lens group G4. The iris diaphragm 19 should be introduced in the zoom lens ZO such that the precondition of telecentricity is retained on the detector 21.

At a specific site, use is made in the individual lens groups of the zoom lens ZO of glasses of long-crown or short flint type. It should be borne in mind with types of glasses that are to be cemented together that the difference in the coefficient $\alpha$ of the thermal linear expansion of the two types of glass is smaller than $2.5 \cdot 10^{-6}$/K, since the zoom lens ZO is used in a relatively wide temperature range. If the difference in the thermal coefficients of linear expansion of the two types of glass is greater than $2.5 \cdot 10^{-6}$/K, it is impossible for the types of glass to be permanently cemented.

For short focal lengths of the zoom lens ZO, attention centres on the correction of the transverse chromatic aberration, since the image-side principle ray is inclined to the optical axes 23 and 23' as a function of color in the image of an object point remote from the axis. The transverse chromatic aberration leads to a linear magnification for each color. In the case of long focal lengths of the zoom lens ZO, attention should be centred on the correction of the longitudinal chromatic aberration, since the focal length of the zoom lens ZO is a function of the frequency of the light. Consequently, the focal length for short wave, that is to say blue light is lower than that for long wave, red light. However, a color correction can be fully achieved when types of glass with abnormal partial dispersion are used. Such glasses are either of long-crown type or short flint type.

The front lens group G1, the variator lens group G2, the compensator lens group G3 and the first base lens group G4.1 of the base lens group G4 are arranged in the long limb of the L-shaped installation space along the common straight first optical axis 23. The second base lens group G4.2 of the base lens group G4, the optical spectral filter 20 and the detector 21 are integrated in the short limb of the L-shaped installation space. The long limb has a maximum length of 245 mm, the short limb having a maximum length of 115 mm. The lengths of the limbs can be varied depending on the design desired for the zoom lens ZO.

The available installation space for the lenses of the groups G1, G2, G3 and G4 are further limited by the position and size of the plane mirror 18 or the deflecting prism, and by the constrictions applying in the air space between the lens 17 and the detector 21. The diameter of the front lens group G1 should be at most 90 mm, that of the variator lens group G2, of the compensator lens group G3 and of the base lens group G4 should be limited to at most 45 mm.

In FIG. 2b, the focal length of the zoom lens ZO is f=122 mm. In order to be able to realize this focal length, the variator lens group G2 and the compensator lens group G3 are displaced in the direction of the first base lens group G4.1 of the base lens group G4 along the first optical axis 23. The distance between the variator lens group G2 and the compensator lens group G3 has become minimally smaller by comparison with FIG. 2a.

The focal length of the zoom lens ZO is f=272 mm in FIG. 2c. The aperture number is 3.2 here. In order to achieve a focal length of f=272 mm, the variator lens group G2 is displaced right up to the compensator lens group G3 along the first optical axis 23. As in figures 2a and 2b, here, as well, a cone 22' and a centroid ray 22 of a further cone (not illustrated) are imaged in order to display the optical path.

The first angle $\alpha$ between the long limb and the short limb of the L-shaped installation space is 75° in all three figures. The first angle $\alpha$ can also be of variable design, wherein the first angle $\alpha$ should be preferably in the range between 50° and 130°. For example, the first angle $\alpha$ can have a value of 85°, although it should be borne in mind that the focusing characteristics can still be realized. If there is no precondition limiting the installation space, it is also possible that there need be no beam deflection. Consequently, there is also no need for a plane mirror 18 for beam deflection.

A CCD detector whose image diagonals are 21.45 mm is used as receiver 21.

It is possible with the aid of this design to implement a zoom lens ZO that satisfies the requirements with reference to the zoom factor, the focal range, the aperture number, the image diameter, the telecentric position of the exit pupil and the focusing characteristics, for example, for military reconnaissance. Moreover, a very good polychromatic correction of the zoom lens ZO can be achieved with the aid of this design.

What is claimed is:

1. A zoom lens, comprising in a direction of light propagation:
    a front lens group having positive refractive power,
    a variator lens group having negative refractive power,
    a compensator lens group having positive refractive power,
    a base lens group having positive refractive power,
    wherein said base lens group comprising a first base lens group and a second base lens group,
    wherein said front lens group, said variator lens group, said compensator lens group and said first base lens group are arranged along a common straight first optical axis,
    wherein said second base lens group is arranged along a second optical axis inclined with respect to said first optical axis at a first angle $\alpha$ different from 0 and 180°, and
    wherein a beam deflector is arranged between said first base lens group and said second base lens group.

2. The zoom lens as claimed in claim 1, wherein said variator lens group and said compensator lens group are arranged moveably along said first optical axis for zooming.

3. The zoom lens as claimed in claim 1, further comprising a diaphragm arranged in the direction of light propagation in front of said first base lens group.

4. The zoom lens as claimed in claim 3, wherein said diaphragm is arranged at a distance from said first base lens group and wherein said distance is fixed during zooming.

5. The zoom lens as claimed in claim 4, wherein said base lens group having a front focal plane and a back focal plane and wherein said diaphragm is arranged in the neighbourhood of said front focal plane.

6. The zoom lens as claimed in claim 2, wherein said second base lens group is arranged moveably along said second optical axis for focusing.

7. The zoom lens as claimed in claim 1, wherein said first base lens group has a positive refractive power and wherein said second base lens group has a positive refractive power.

8. The zoom lens as claimed in claim 1, wherein said first angle $\alpha$ is in the range between 50° and 130°.

9. The zoom lens as claimed in claim 1, wherein said beam deflector is a plane mirror with a mirror surface having a normal to the mirror surface wherein said normal to the mirror surface being inclined to said first optical axis at a second angle which is a half of said first angle.

10. The zoom lens as claimed in claim 1, wherein said beam deflector is a deflecting prism.

11. The zoom lens as claimed in claim 5, wherein said first base lens group and said second base lens group are arranged at a distance along said first and second optical axis, which distance is at least 15% of the overall length of said zoom lens measured from a vertex of said front lens group to said back focal plane of said base lens group.

12. The zoom lens as claimed in claim 1, further comprising an optical spectral filter.

13. The zoom lens as claimed in claim 12, wherein said optical spectral filter is arranged between said second base lens group and said back focal plane of said base lens group.

14. The zoom lens as claimed in claim 13, wherein said optical spectral filter is arranged rotatably around said second optical axis.

15. The zoom lens as claimed in claim 1, said zoom lens providing a zoom factor of 8.

16. The zoom lens as claimed in claim 1, said zoom lens having an aperture number of at least 3.2.

17. The zoom lens as claimed in claim 1, said zoom lens having a variable focal range from 34 mm to 272 mm.

18. A Military reconnaissance system comprising:
a zoom lens,
a detector in a detector plane of said zoom lens,
said zoom lens comprising:
a front lens group having positive refractive power,
a variator lens group having negative refractive power,
a compensator lens group having positive refractive power,
a base lens group having positive refractive power,
wherein said base lens group comprising a first base lens group and a second base lens group,
wherein said front lens group, said variator lens group, said compensator lens group and said first base lens group are arranged along a common straight first optical axis,
wherein said second base lens group is arranged along a second optical axis inclined with respect to said first optical axis at a first angle $\alpha$ different from 0° and 180°, and
wherein a beam deflector is arranged between said first base lens group and said second base lens group.

19. The Military reconnaissance system as claimed in claim 18, wherein said first angle $\alpha$ is in the range between 50° and 130°.

20. The Military reconnaissance system as claimed in claim 18, wherein said variator lens group and said compensator lens group are arranged moveably along said first optical axis for zooming.

21. The Military reconnaissance system as claimed in claim 20, wherein said second base lens group is arranged moveably along said second optical axis for focusing.

22. The Military reconnaissance system as claimed in claim 20, wherein said variator lens group and said compensator lens group are moveably independently of a movement of said second base lens group.

* * * * *

UNITED STATES PATENT AND TRADEMARK OFFICE
CERTIFICATE OF CORRECTION

PATENT NO.    : 6,856,468 B2
DATED         : February 15, 2005
INVENTOR(S)   : Bertram Achtner It is certified that error appears in the above-identified patent and that said Letters Patent is hereby corrected as shown below:

Column 2,
Line 26, delete "refractive powers, of the groups" and replace with -- refractive powers of the two groups --.

Column 3,
Line 6, delete "linear expansion a of the two lenses" and replace with -- linear expansion α of the two lenses --.

Column 4,
Line 52, delete "spectral region of course, it is" and replace with -- spectral region. Of course, it is --.

Column 6,
Line 55, delete "from 0 and 180°," and replace with -- from 0° and 180°, --.

Signed and Sealed this

Ninth Day of August, 2005

JON W. DUDAS
*Director of the United States Patent and Trademark Office*